United States Patent
Swanson et al.

(10) Patent No.: US 6,722,872 B1
(45) Date of Patent: Apr. 20, 2004

(54) HIGH TEMPERATURE MODELING APPARATUS

(75) Inventors: William J. Swanson, St. Paul, MN (US); Patrick W. Turley, Eden Prairie, MN (US); Paul J. Leavitt, Minneapolis, MN (US); Peter J. Karwoski, Circle Pines, MN (US); Joseph E. LaBossiere, Lino Lakes, MN (US); Robert L. Skubic, Chanhassen, MN (US)

(73) Assignee: Stratasys, Inc., Eden Prairie, MN (US)

( * ) Notice: Subject to any disclaimer, the term of this patent is extended or adjusted under 35 U.S.C. 154(b) by 249 days.

(21) Appl. No.: 10/018,673

(22) PCT Filed: Jun. 23, 2000

(86) PCT No.: PCT/US00/17363
§ 371 (c)(1),
(2), (4) Date: Dec. 13, 2001

(87) PCT Pub. No.: WO00/78519
PCT Pub. Date: Dec. 28, 2000

Related U.S. Application Data

(60) Provisional application No. 60/140,613, filed on Jun. 23, 1999.

(51) Int. Cl.$^7$ .......................... B29C 41/02; B29C 41/36
(52) U.S. Cl. ........................ 425/225; 425/226; 425/375
(58) Field of Search ................................ 425/225, 226, 425/375

(56) References Cited

U.S. PATENT DOCUMENTS

| | | | | |
|---|---|---|---|---|
| 4,749,347 A | * | 6/1988 | Valavaara | 425/135 |
| 5,121,329 A | * | 6/1992 | Crump | 425/174.4 |
| 5,402,351 A | * | 3/1995 | Batchelder et al. | 364/468 |
| 5,764,521 A | * | 6/1998 | Batchelder et al. | 425/375 |
| 5,866,058 A | * | 2/1999 | Batchelder et al. | 264/308 |
| 5,939,008 A | * | 8/1999 | Comb et al. | 264/308 |
| 6,261,077 B1 | * | 7/2001 | Bishop et al. | 425/174.4 |

OTHER PUBLICATIONS

Paper entitled "High Temperature Fused Deposition Modelling: An Experimental Study Focusing on Modelling Materials", by F.K. Feenstra, from Time–Compression Technologies '98 Conference (Oct. 13–14, 1998, Nottingham, U.K.).*

* cited by examiner

Primary Examiner—Robert B. Davis
(74) Attorney, Agent, or Firm—Kinney & Lange, P.A.

(57) ABSTRACT

Disclosed is a three-dimensional modeling apparatus (10) that builds up three-dimensional objects in a heated build chamber (24) by dispensing modeling material from a dispensing head (14) onto a base (16) in a pattern determined by control signals from a controller (140). The motion control components (18, 20) of the apparatus (10) are external to and thermally isolated from the build chamber (24). A deformable thermal insulator (132) forms a ceiling of the building chamber, allowing motion control of the dispensing head (14) in an x, y plane by an x-y gantry (18) located outside of and insulated from the build chamber (24). In the preferred embodiment, a material dispensing outlet (66) of the dispensing head is inside the chamber. Thermal isolation of the motion control components from the build chamber allows the chamber to be maintained at a high temperature.

22 Claims, 7 Drawing Sheets

HIGH TEMPERATURE MODELING APPARATUS

BACKGROUND OF THE INVENTION

The present invention relates to the fabrication of three-dimensional objects using additive process modeling techniques. More particularly, the invention relates to modeling machines which form three-dimensional objects in a heated chamber by depositing modeling material from a dispensing head onto a modeling base as the dispensing head and the base are moved in three-dimensions with respect to each other.

Additive process modeling machines make three-dimensional models by building up a modeling medium, usually in planar layers, based upon design data provided from a computer aided design (CAD) system. A mathematical description of a physical part to be created is split into (usually) planar layers, and those layers are individually shaped and applied to produce the final part. Three-dimensional models are used for functions including aesthetic judgments, proofing the mathematical CAD model, forming hard tooling, studying interference and space allocation, and testing functionality. The dominant application of layered manufacturing in recent years has been for rapid prototyping.

Examples of apparatus and methods for making three-dimensional models by depositing layers of flowable modeling material are described in Valavara U.S. Pat. No. 4,749,347; Crump U.S. Pat. No. 5,121,329, Batchelder, et al. U.S. Pat. No. 5,303,141, Crump U.S. Pat. No. 5,340,433, Batchelder, et al. U.S. Pat. No. 5,402,351, Crump et al. U.S. Pat. No. 5,503,785, Abrams et al. U.S. Pat. No. 5,587,913, Danforth, et al. U.S. Pat. No. 5,738,817, Batchelder, et al. U.S. Pat. No. 5,764,521 and Comb et al. U.S. Pat. No. 5,939,008, all of which are assigned to Stratasys, Inc., the assignee of the present invention. An extrusion head extrudes heated, flowable modeling material from a nozzle onto a base The base comprises a modeling substrate which is removably affixed to a modeling platform. The extruded material is deposited layer-by-layer in areas defined from the CAD model, as the extrusion head and the base are moved relative to each other in three dimensions by an x-y-z gantry system. The material solidifies after it is deposited to form a three-dimensional model. It is disclosed that a thermoplastic material may be used as the modeling material, and the material may be solidified after deposition by cooling.

Technology described in the aforementioned patents is commercialized in Stratasys FDM® modeling machines. The extrusion head, which includes a liquifier and a dispensing nozzle, receives modeling material in a solid form. The filament is heated to a flowable temperature inside the liquifier and it is then dispensed through the nozzle. Thermoplastic materials, particularly ABS thermoplastic, have been found particularly suitable for deposition modeling in the Stratasys FDM® modeling machines. A controller controls movement of the extrusion head in a horizontal x, y plane, controls movement of the build platform in a vertical z-direction, and controls the feeding of modeling material into the head. By controlling these processing variables, the modeling material is deposited at a desired flow rate in "beads" or "roads" layer-by-layer in areas defined from the CAD model to create a three-dimensional object that resembles the CAD model. The modeling material thermally solidifies, and the finished model is removed from the substrate.

As a thermoplastic material cools, and particularly as it transitions from a flowable material to a solid, stresses caused by density changes of the thermoplastic (i.e., shrinkage) are generated in the material. These stresses can cause geometric distortion of a model. Accordingly, it is an objective in model building systems which employ thermal solidification to relieve the stresses caused by cooling, so as to minimize geometric distortion. Deposition materials other than thermoplastics, such as metals, thermoset polymers and composites share analogous challenges of minimizing geometric distortion produced by changes in density, shear, temperature and pressure associated with the extrusion process. As disclosed in U.S. Pat. No. 5,866,058, building the model in a chamber heated to a temperature higher than the solidification temperature of the thermoplastic or other thermally solidifiable modeling material, followed by gradual cooling, relieves stresses from the material. The stresses are annealed out of the model while is being built so that the finished model is stress free and has very little distortion. As is further disclosed in the '058 patent, the temperature of the chamber should be maintained below the glass transition temperature ($T_g$) of the modeling material, so that the model does not become so weak that it droops. The preferred temperature of the build chamber is in a range between the material's solidification temperature and its creep relaxation temperature (creep relaxation temperature is defined as the point at which the stress relaxation modulus has dropped by a factor of ten from its low temperature limit). In the case of ABS thermoplastic, the temperature window falls between approximately 70° C. and 90° C.

Existing Stratasys FDM® machines build models in a chamber (also referred to as a build envelope or oven) heated to between 70° C. and 90° C. The base on which the model is built is located in the heated chamber, as are the extrusion head and the x-y-z gantry. Placing the extrusion head and the x-y-z gantry in this heated environment has many disadvantages. The x-y-z gantry is comprised of motion control components, such as motors, bearings, guide rods, belts and cables. Placing these motion control components inside the heated chamber minimizes the life of these components. Additionally, the upper limit on the chamber temperature is constricted to a temperature at which the motion control components are operable. Such a limitation on the temperature of the chamber consequently limits the materials useful for modeling in the machine to those which will stress relieve at a relatively low temperature.

Similarly, placing the extrusion head in the heated chamber in the Stratasys FDM® machines required that a cooling mechanism be provided to cool the modeling material feedstock as it is supplied to the head in solid form (either as a filament or a wafer of material). A mechanism for cooling wiring harnesses is also provided. In the event of a power failure or power down, the material feedstock and the wiring harnesses that are normally cooled are exposed to the oven temperature. Finally, as a practical matter, in the event that adjustment, servicing, repair, replacement or of the motion control components or of the extrusion head are required, an operator must work inside the chamber. As such, the chamber must be cooled before these activities can be safely performed.

BRIEF SUMMARY OF THE INVENTION

The present invention is a three-dimensional modeling apparatus having motion control components located external to a thermally insulated chamber in which objects are built. Three-dimensional objects are formed by dispensing modeling material from a dispensing head onto a base as the dispensing head and the base are moved in three-dimensions relative to one another in a pattern determined by control signal from a controller. In a preferred embodiment, an x-y gantry moves the dispensing head in an x,y plane and a z-lift moves the base in a vertical z-direction. In this embodiment, a deformable thermal insulator forms a portion of the build chamber through which the dispensing head is moved, the dispensing head having a modeling material dispensing outlet inside of the build chamber and a modeling material receiving inlet external to the build chamber. The z-lift is coupled to the base through sealed slits in a wall of the build chamber.

There are a number of advantages to thermally insulating motion control components from the build chamber. Because the temperature of the build chamber is not limited by the operating temperature of the motion control components, the machine of the present invention permits building models from materials that stress relieve at a relatively high temperature. Further, the life of the motion control components is not negatively effected by the temperature of the build chamber. Thermal insulation of motion control components from the build chamber also increases ease of use in the event that the user needs to access and touch these components. The increased life of the motion control components and the increased ease of use of the apparatus of the present invention result in increased throughput and reliability.

DETAILED DESCRIPTION

The apparatus of the present invention is an apparatus that builds three-dimensional objects in a heated chamber using a fused deposition process, wherein motion control components are isolated from the heated chamber so that the temperature in the heated chamber is not limited by the temperature limits of the motion control components. The apparatus enables the building of objects from materials that have a high glass transition temperature and thus must be deposited into a high temperature chamber in order for a high quality model to result These materials include high temperature thermoplastics, such as polycarbonate, polyetherimide, polysulfone, polyethersulfone, amorphous polyamides and others.

Figure 1:
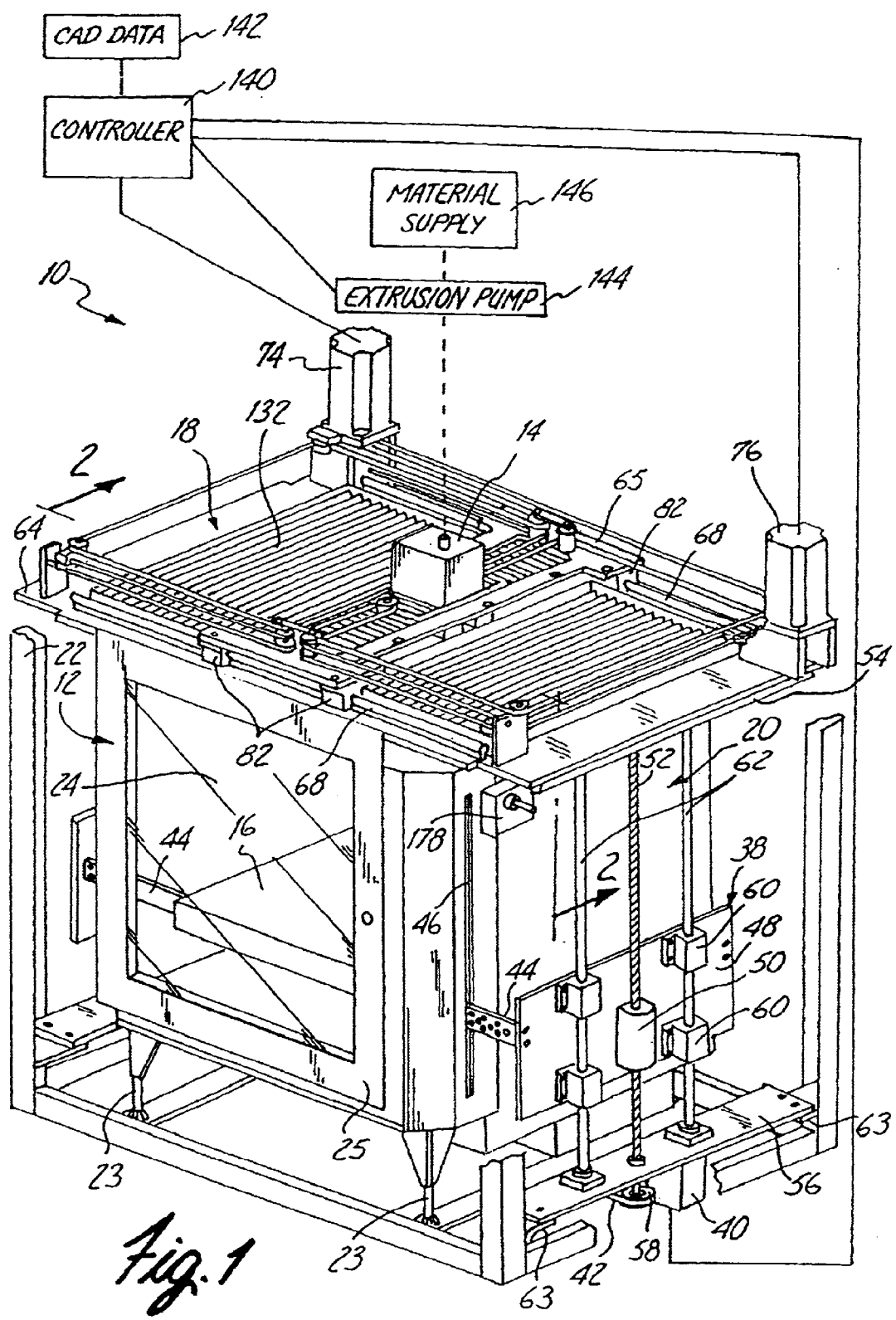
FIG. 1 is a perspective, diagrammatic view of a three-dimensional modeling apparatus according to the present invention.

A preferred embodiment of the three-dimensional modeling apparatus according to the present invention is shown in FIG. 1. The apparatus 10 comprises an oven 12, an extrusion head 14, a platform 16, an x-y gantry 18 which moves the extrusion head 14 in a horizontal x,y plane, a z-lift 20 which moves the platform 16 along a vertical z-axis, and a frame 22. The oven 12 stands on legs 23 which are mounted inside of the frame 22. The frame 22 lines the outer perimeter of the oven 12 (shown in FIG. 1 with portions broken away), and supports the oven 12, the x-y gantry 18 and the z-lift 20 in a defined configuration.

The platform 16 is contained in a heated build chamber 24 of oven 12, beneath the extrusion head 14. The apparatus 10 builds three-dimensional objects in build chamber 24 by depositing modeling material from extrusion head 14 onto the platform 16, while the extrusion head 14 is moved in the x,y plane and the platform 16 is moved along the z-axis. To support an object as it is being built, the platform 16 must have an upper surface to which the modeling material will adhere. Preferably, a modeling substrate is mounted on top of the platform 16 upon which the object is built. Use of a modeling substrate allows for easy removal of the model from the apparatus after completion of the model. A modeling substrate selected for use in the present invention should be suitable for use in a high temperature environment. For example, the platform 16 may be a vacuum platen having a flexible sheet substrate removably mounted thereon, as is disclosed in Comb et al. U.S. Pat. No. 5,939,008. The flexible sheet substrate adheres to the platform when a vacuum pump is turned on and is released from the platform when the pump is turned off. For adaptation to the high temperature environment of the present invention, a heat exchanger (e.g., an in-line heat exchanger coil) may be necessary to cool the air flowing into the vacuum pump. The material chosen for use as a flexible sheet substrate should be a material that will bond with the modeling material. In building a model made of a high temperature thermoplastic, a flexible sheet of high temperature thermoplastic is a preferred substrate. A model made of Ultem™ has been successfully built in a chamber heated to approximately 200° C., on a thin sheet of Ultem™ mounted on a vacuum platen.

Figure 2:
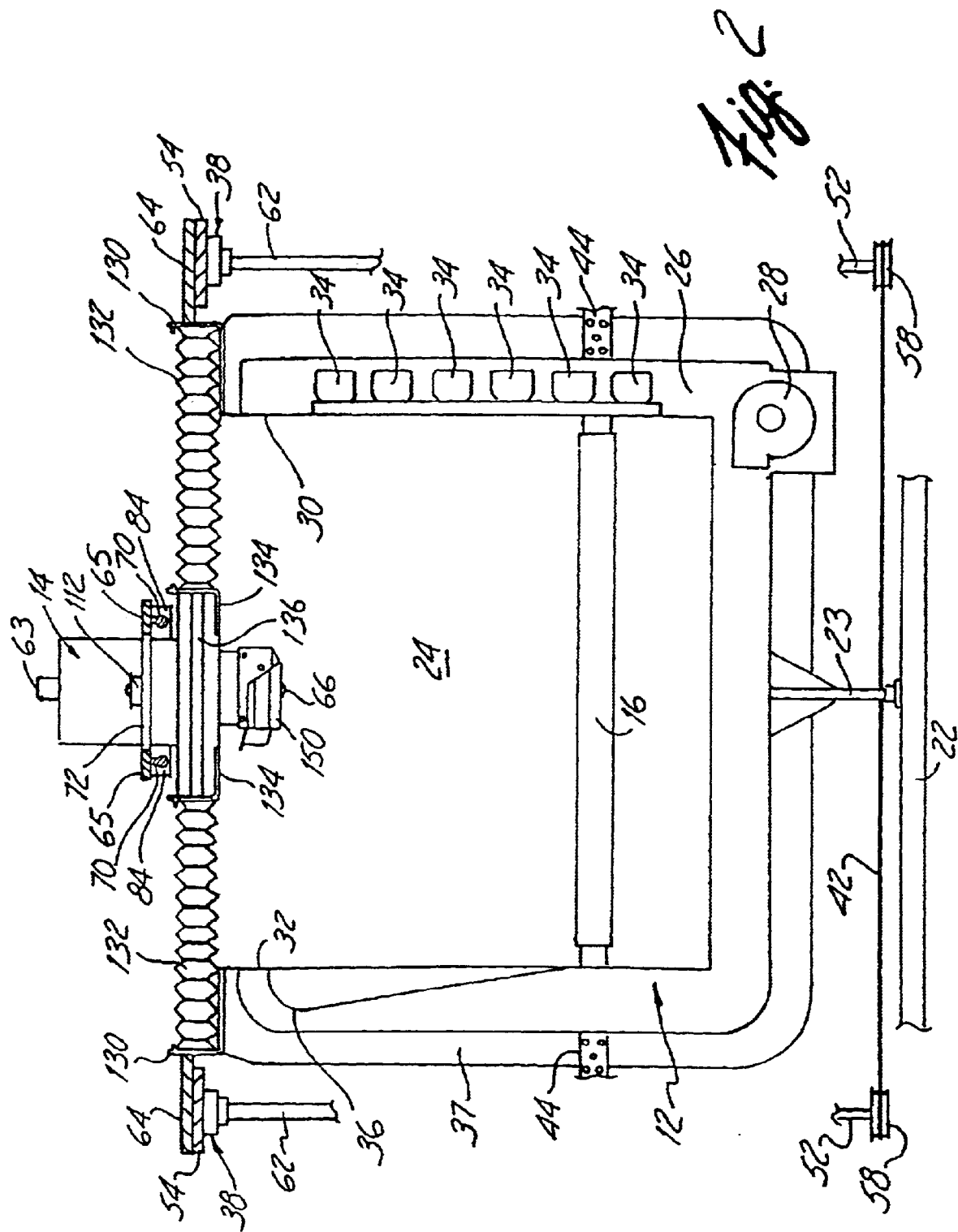
FIG. 2 is a front sectional view of the three-dimensional modeling apparatus shown in FIG. 1, taken along a line 2—2.

The build chamber 24 of the oven 12 is accessible through an insulated oven door 25. As shown in FIG. 2, the build chamber 24 has a floor and right and left sides which are surrounded by a heating duct 26. The heating duct 26 is formed of sheet metal and opens to the build chamber 24 at the top right and top left sides of the chamber 24. A pair of blowers 28 (one shown), located underneath the oven 12 on the right hand side, create a clockwise air flow path through the heating duct 26. Thus, the opening at the top right side of the chamber 24 is an air intake vent 30 and the opening at the top left side of the chamber 24 is an air exhaust vent 32. Two identical banks of six 750 Watt fin-strip heaters 34 are mounted in the heating duct 26 on the air intake side thereof. A venturi 36 is positioned in the heating duct 26 to create a straight flow pattern of air returning to the build chamber 24 through the air exhaust vent 32. The build chamber 24 is heated by convection as air is pulled through the heaters 34, circulated through the duct 26, and returned to the chamber. A sheaf of insulation 37 surrounds the right and left side, the bottom, and a back side of the oven 12 to keep in the heat (insulation 37 is removed in FIG. 1 for purposes of illustration). The build chamber 24 is designed to reach temperatures of at least 200° C. Preferably, a thermocouple and a thermal fuse are placed over the air intake vent 30 so that the temperature in the chamber 24 may be monitored, and, if the chamber 24 becomes too hot, the heaters 34 can be shut off.

The platform 16 is held up inside of the build chamber 24 by the z-lift 20, as shown in FIGS. 1 and 2. The z-lift 20, which is located external to the oven 12, is formed of two of two identical I-sections 38, a z-motor 40 and a timing belt 42. The I-sections 38 are secured to the frame 22 in parallel on right and left sides of the oven 12. The platform 16 is coupled to each I-section 38 of the z-lift 20 by a pair of rigid, horizontal beams 44 which support platform 16 in a horizontal plane. Each beam 44 extends through a vertical slit 46 in the oven 12, allowing the z-lift 20 to move platform 16 vertically within the build chamber 24 On each side of oven 12, there is one slit 46 to the front of the heating duct 26 and another slit 46 to the rear of the heating duct 26. The slits 46 are sealed with flexible strips of silicone to as to minimize heat transfer from the chamber 24 to the z-lift 20. The beams 44 are made of a low conductivity metal such as stainless steel, and are drilled with many holes to further decrease the heat transfer from the chamber 24 to the z-lift 20.

Each I-section 38 is comprised of a vertical plate 48 to which one pair of the beams 44 connect, a lead nut 50 mounted on the vertical plate 48, and a vertical lead screw 52 on which the lead nut 50 rides up and down. The lead screw 52 connects to the underside of a horizontal upper plate 54 at its top end, extends through a horizontal lower plate 56 near its bottom end, and couples to a pulley 58 at its bottom end. The lead screw 52 rotates with rotation of the pulley 58. The pulleys 58 of each I-section 38 are coupled to each other by the timing belt 42.

The pulley 58 of the right-hand I-section 38 is driven by the z-motor 40, which is preferably a servo motor. The z-motor 40 can selectively drive the pulley 58 in either a clockwise or a counterclockwise direction. The timing belt 42 synchronizes movement of the two pulleys 58. The synchronous rotation of the pulleys 58 effects synchronous rotation of the lead screws 52. As the lead screws 52 rotate, the lead nuts 50 move either up or down, causing each vertical plate 48 to be either raised or lowered, depending upon the direction of the pulley rotation.

Two pairs of linear guide bearings 60 are coupled to each vertical plate 48, on opposite sides of the lead nut 50. Each pair of guide bearings 60 has an associated guide rail 62, which extends through each the guide bearings 60 in parallel with the lead screw 52. The top of each guide rail 62 connects to the underside of upper plate 54, and the bottom of each guide rail 62 connects to the top of lower plate 56. The guide bearings 60 rides along the guide rails 62, providing lateral support for the vertical plate 48 as it travels up and down. Pairs of brackets 63 connected to the upper plate 54 and to the lower plate 56 of each I-section 38 mount the I-sections 38 to the frame 22.

The extrusion head 14 is moved in an x,y plane above the platform 16 by the x-y gantry 18, which is mounted on top of the oven 12. As shown in FIG. 2, the extrusion head 14 has an inlet 63 for receiving modeling material and an outlet nozzle 66 for dispensing the modeling material onto the platform 16 in a flowable state. The nozzle outlet 66 will typically be heated so as to deposit the modeling material at a predetermined temperature. The extrusion head nozzle 66 is located inside of the build chamber 24. In the preferred embodiment, the extrusion head inlet 63 is located external to the build chamber 24. Hence, the extrusion head 14 extends through the top of the oven 12. Because the extrusion head 14 of the preferred embodiment must be allowed to move in the x,y plane, the top of the oven 12 is formed of a deformable thermal insulator, which is described in detail below.

Figure 3:
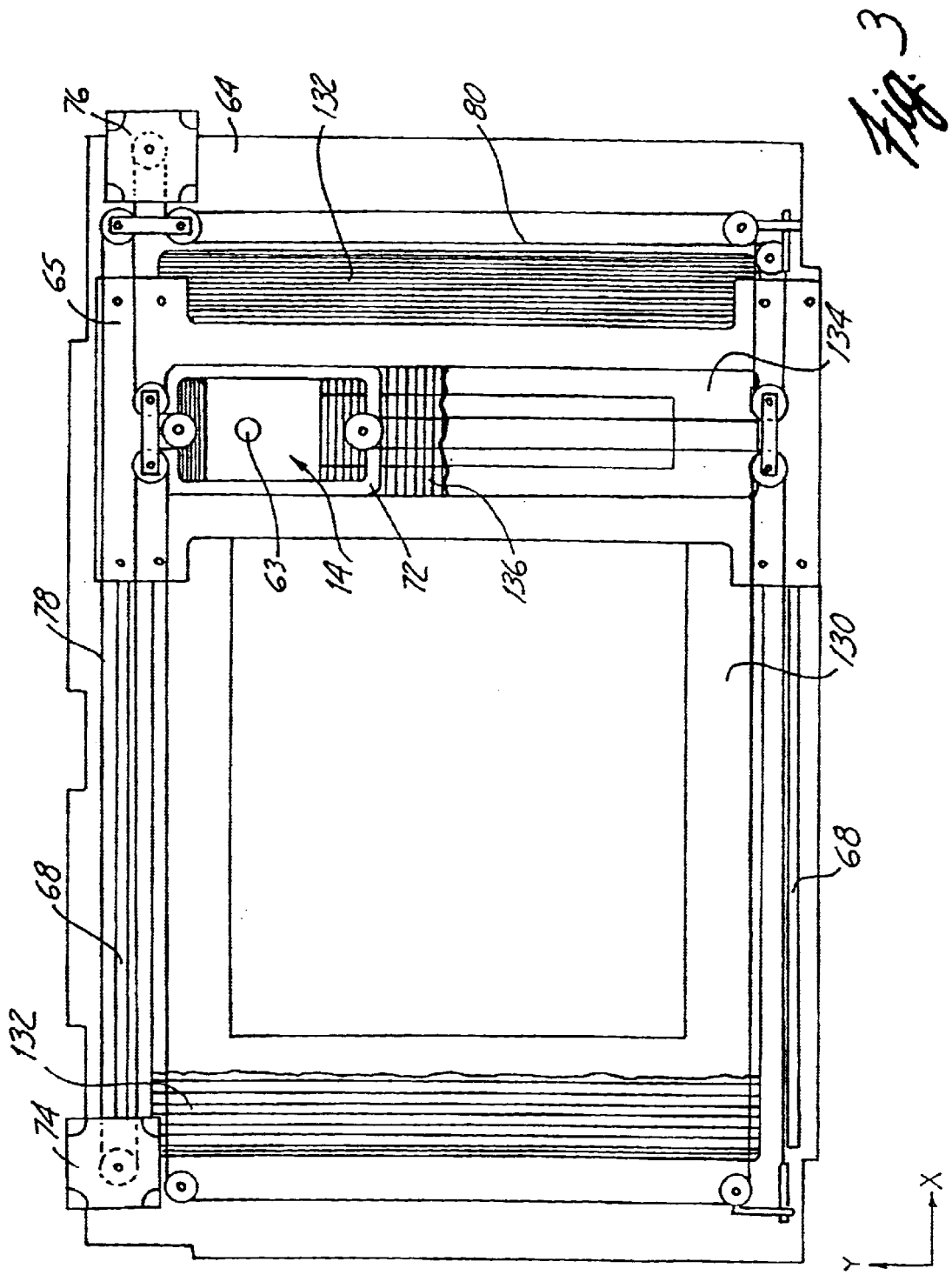
FIG. 3 is a top view of the x-y gantry, the deformable thermal insulator (portions broken away) and the extrusion head.

The x-y gantry 18 is shown in FIGS. 1–3. The x-y gantry 18 comprises a base. Plate 64, a bridge 65, a pair of x-rails 68, a pair of y-rails 70, a carriage 72, an x-motor 74, a y-motor 76, an x-drive belt 78, a y-drive belt 80 and various pulleys. The base plate 64, which has an open center, sits on top of the upper plates 54 of the z-lift 20 and is secured to the frame 22. The bridge 65 has an open center and extends across base plate 64 in the y-direction. The x-rails 68 are mounted on top of base plate 64 beneath forward and rearward ends of the bridge 65, and extend along the base plate 64 in the x-direction. The bridge 65 is coupled to the rails 68 by two pairs of bearings 82. One pair of the bearings 82 are mounted to the underside of the forward end of the bridge 65, and the other pair of bearings 82 are mounted to the underside of the rearward end of bridge 65. Bearings 82 permit movement of the bridge 65 along the x-rails 68.

The y-rails 70 are mounted to the underside of the bridge 65 on opposite sides of the open center portion thereof. The y-rails 70 run parallel to each other in the y-direction. The carriage 72 is coupled to the y-rails 70 by two opposed pairs of bearings 84. The carriage 72, seated on the y-rails 70, is positioned in the open center portion of the bridge 65. The extrusion head 14 is mounted to the carriage 72, so that movement of the carriage 72 along the y-rails 70 moves the extrusion head 14 in the y-direction. The extrusion head 14 is mounted in the carriage 72 such that the extrusion head inlet 63 is above the bridge 65 and the extrusion head nozzle 66 is below the bridge 65.

The x-motor 74, via x-belt 78 and several pulleys, moves the bridge 65 back and forth along the x-rails 68, to effect movement of the extrusion head 14 in the x-direction. The y-motor 76, via y-belt 80 and several pulleys, moves the carriage 72 along the y-rails 70 to effect movement of the extrusion head 14 in the y-direction. This system is known as an H-bridge gantry.

Figure 4:
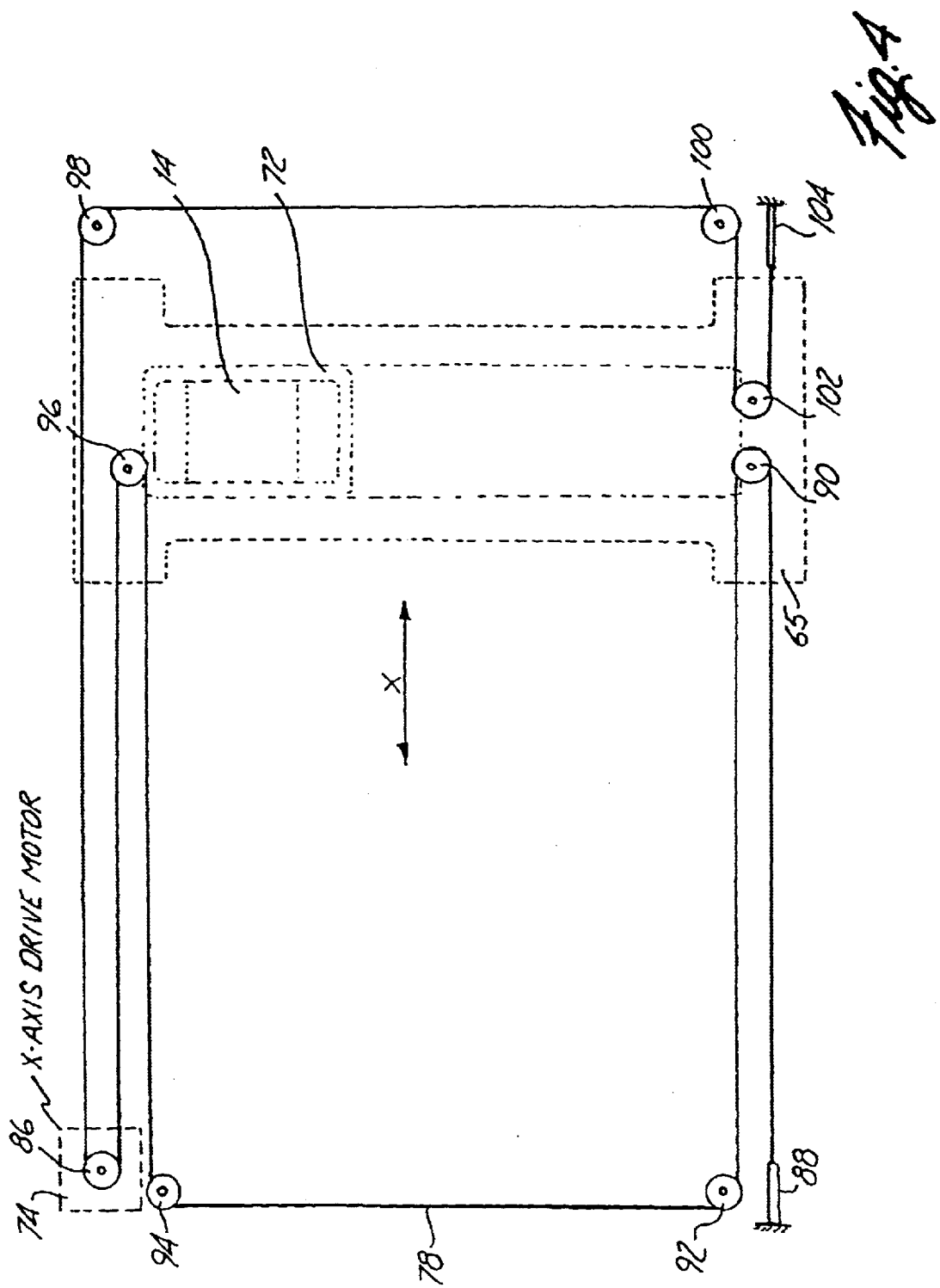
FIG. 4 is a schematic representation of the x-axis drive system.

A schematic representation of the x-axis drive system is shown in FIG. 4. As shown, x-belt 78 is driven by the x-motor 74 by rotation of a drive pulley 86. The x-belt 78 is secured at a tie-down 88, sequentially wraps around pulleys 90, 92, 94, 96. 86, 98, 100 and 102, and is then secured again at a tie-down 104. Pulleys 90, 96 and 102 are mounted on the bridge 65, while pulleys 92, 94, 98 and 100 are mounted on the base plate 64.

Figure 5:
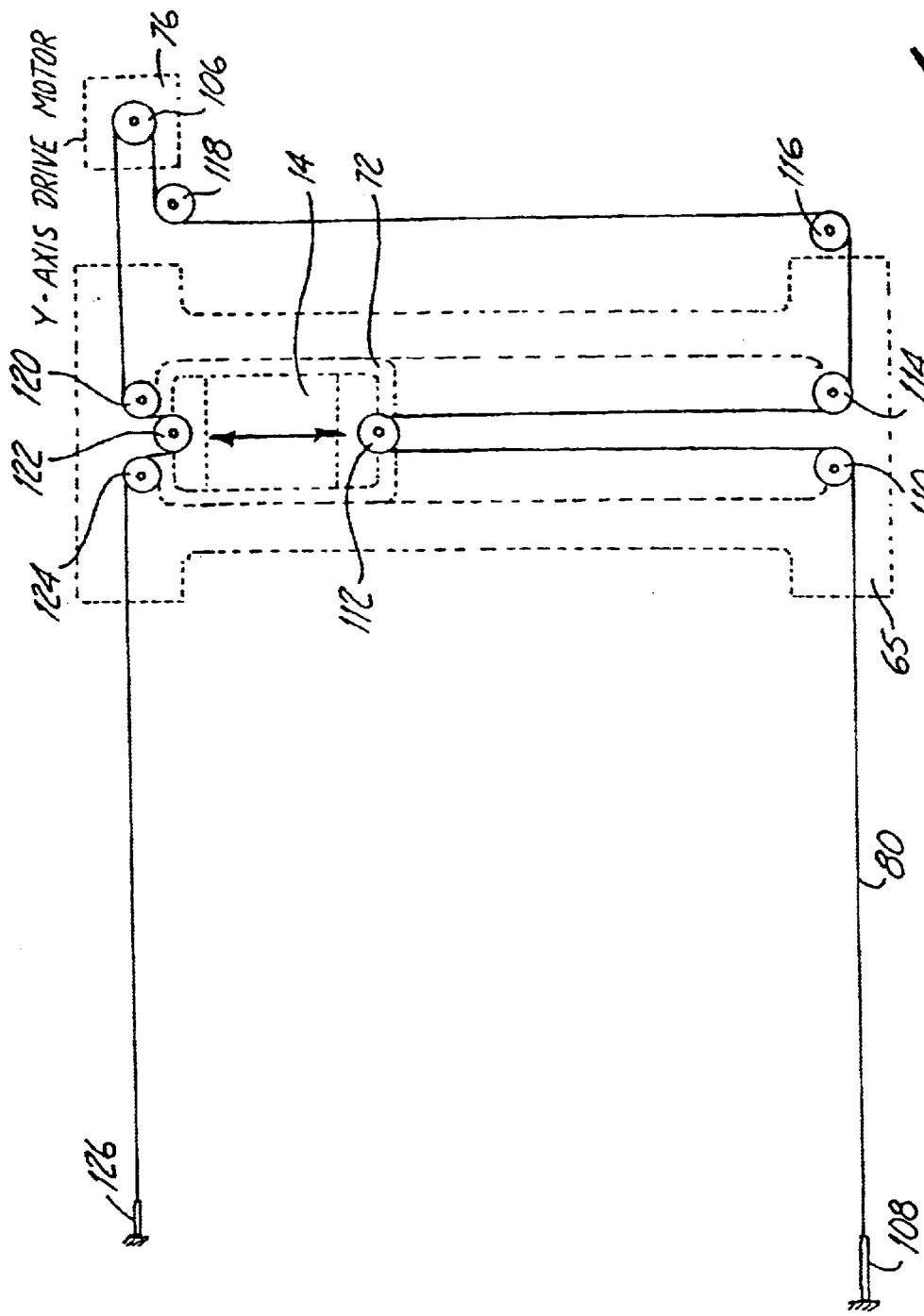
FIG. 5 is a schematic representation of the y-axis drive system.

The y-axis drive system is shown schematically in FIG. 5. The y-belt 80 is driven by the y-motor 76 by rotation of a drive pulley 106. The y-belt 80 is secured at a tie-down 108, wraps in sequence around pulleys 110, 112, 114, 116, 118, 106, 120, 122 and 124, and is then secured again at a tie-down 126. Pulleys 110, 114, 120 and 124 are mounted to the bridge 65, pulleys 116 and 118 are mounted to the base plate 64, and pulleys 122 and 112 are mounted to the carriage 72. The pulleys 110, 114 and 124 share the same axis of rotation as pulleys 90, 102 and 96, respectively, of the x-axis drive system.

Preferably, the x-motor 74 and the y-motor 76 are servo motors. In the preferred embodiment, both motors are stationary to reduce the weight of moving components, thus resulting in the fairly extensive belt routing configuration. The tension in the x-belt 78 may be adjusted by adjustment at the tie-downs 88 and 104. The tension in the y-belt 80 may be adjusted by adjustment at the tie-downs 108 and 126.

The motion control components of the x-y gantry 18 are located external to and are insulated from the build chamber 24 by a deformable thermal insulator comprising two sets of insulating accordion-folding baffles, as shown in FIGS. 1–3. An x-baffle tray 130, having an open center, is attached to and lines the interior perimeter of the base plate 64 to support a set of x-baffles 132. The x-baffles 132 extend from the base plate 64 to the bridge 65, on both the right and left sides of the bridge 65. A y-baffle tray 134, also having an open center, sits beneath and is attached to the underside of the bridge 65 to support a set of y-baffles 136. The set of y-baffles 136 extend from the base plate 64 to the extrusion head 14, on both the front and back side of the extrusion head. The x-baffles 132 are secured to the bridge 65 by attachment to the y-baffle tray 134. In FIG. 3, the sets of baffles 132 and 136 are removed in part, so as to show the trays 130 and 134.

The x-baffles 132 supported by tray 130 and the y-baffles 136 supported by tray 134 form a deformable, insulating ceiling of the build chamber 24. The x-baffles 132 compress and expand with the movement of the bridge 65 back and forth along the x-rails 68. The y-baffles 136 compress and expand with the movement of the carriage 72 along the y-rails 70.

In the preferred embodiment, the two sets of baffles 132 and 136 are made out of a high temperature cloth material, such as Teflon™ coated fiberglass. The baffles are sewn with octagonal cross-sections so as to allow expansion and contraction and to insulate the x-y gantry 18 from the heat in the build chamber 24. Other baffle configurations are known in the art and could be used instead of the coated cloth. For example, the baffles could be welded out of thin stainless steel sheet or the baffles could be formed by sliding plates on plates. Optionally, a fan may be mounted over the x-gantry 18 so as to dissipate any heat that does escape from the build chamber 24, keeping the x-y gantry 18 at ambient temperature.

The apparatus 10 builds three-dimensional objects by depositing modeling material layer-by-layer from the extrusion head 14 onto the platform 16 under the control of a controller 140. The material is deposited in a fluent state and fuses to the previously deposited material. The controller 140 receives CAD data 142 defining an object to be built and generates drive signals based upon this data, in a known manner, as illustrated schematically in FIG. 1. The drive signals are sent to the x-motor 74, the y-motor 76 and the z-motor 40, to control movement of the extrusion head 14 and platform 16. Also as illustrated in FIG. 1, in synchrony with controlling movement of the extrusion head 14 and the platform 16, the controller 140 generates drive signals to control an extrusion pump 144. The extrusion pump 144 responsively feeds modeling material from a material supply 146 to the inlet 63 of extrusion head 14, and controls the rate of extrusion of the material from the nozzle 66. By controlling the rate of extrusion while moving the extrusion head 14 over the platform 16 in a pattern determined by the CAD data, a three-dimensional object which resembles a CAD model is created.

In building an object, the platform 16 is initially placed in a raised position, in close proximity to the nozzle 66 of extrusion head 14. Deposition of the material may then take place by depositing successive horizontal layers of modeling material while incrementally lowering the platform 16 following the formation of each layer. Or, the layers can be formed in a vertical plane or in a plane oriented at any angle with respect to horizontal.

Those skilled in the art will recognize that enumerable modifications may be made to the deposition forming process to be carried out by the apparatus of the present invention and to the described embodiment of the apparatus. As an alternative to the gantry arrangement of the preferred embodiment, wherein the extrusion head 14 is moved in the x-y plane while the platform 16 is moved along the z-axis, the platform 16 may be supported for movement in an x-y plane with the extrusion head 14 mounted for movement along the z-axis towards and away from the platform 16. In such a case, the deformable thermal insulator would form a portion of the build chamber through which the gantry moves the platform. It will also be appreciated that movement in the x-y plane need not be limited to movement in orthogonal directions, but may include movement in radial, tangential, arcuate and other directions in the x-y plane. Likewise, in place of the x-y gantry 18 and the z-lift 20, an x-y-z gantry may take the form of any of the mechanical drive systems well known in the art which are controllable by drive signals generated from a controller. In pace of the x-baffles 132 and the y-baffles 136, any deformable thermal insulator may be used that is compatible with the build environment.

As a further alterative, it should be understood that the present invention may be practiced with advantage in an arrangement wherein the x-y gantry 18 is outside of and insulated from the build chamber 24 but the z-lift 20 is inside the chamber 24. Where modeling material is deposited in layers from an extrusion head moved in an x-y plane by the gantry 18 as in the disclosed embodiment, movement in the x-y plane far exceeds movement of the base along the z-axis. So, the z-lift need not have the speed nor precision of the x-y gantry. In such a case, the x-y gantry may be considerably more costly than the z-lift, making replacement of the motion control components of the z-lift more feasible.

It will be understood by those skilled in the art that any movable head having at least one outlet for dispensing fluent modeling material may be used in carrying out the deposition process of the present invention, provided that the head can be controlled to dispense fluent material in a geometry determined by control signals. Such apparatus may include, for example, conventional piston or plunger types of dispensing mechanisms, or highly controllable screw-type feeders such as that disclosed in U.S. Pat. No. 5,312,224.

Likewise, various forms of material feedstock may be used for the material supply 146. The modeling material may for example be supplied in solid form as a continuous flexible filament wound on a supply reel or as a solid rods of limited length, such as described in U.S. Pat. No. 5,121,329. The modeling material may alternatively be supplied in the form of wafers, such as described in U.S. Pat. No. 5,764,521, or the material may be pumped in liquid form from a reservoir, such as described in U.S. Pat. No. 4,749,347. Regardless of the form in which the feed stock material is supplied to the dispensing head, the material supply pump must be controllable so that the dispensing rate of the material can be controlled accurately to form the three-dimensional object. The pump must be matched to the feedstock type and to the dispensing head.

Figure 6:
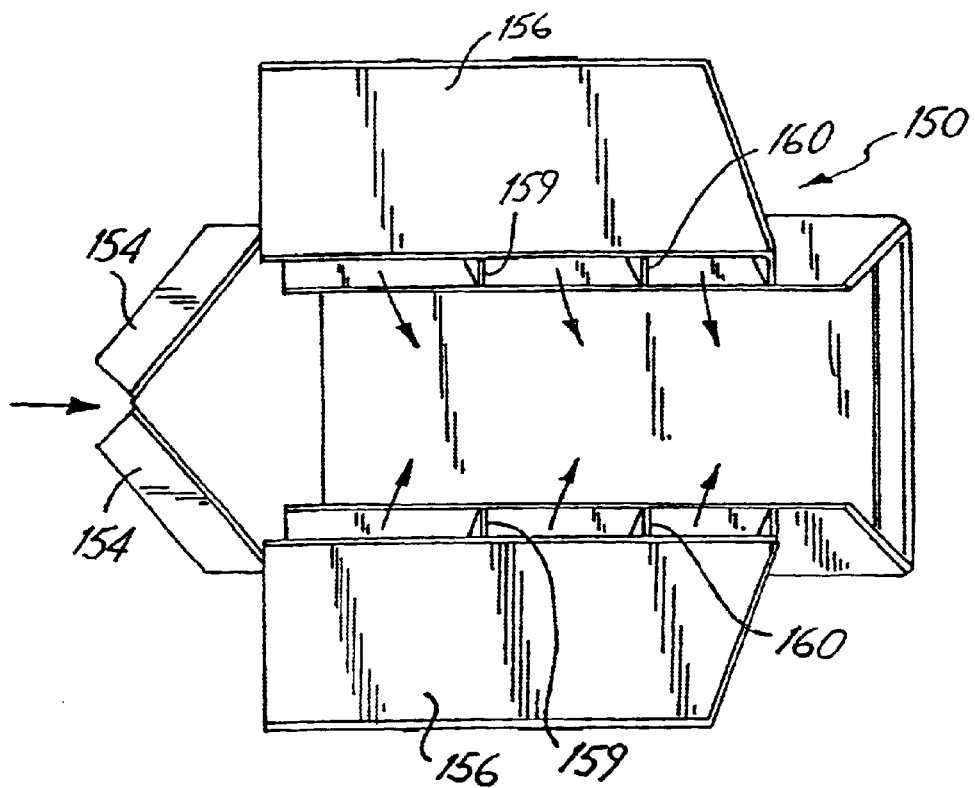
FIG. 6 is a bottom plan view of an air deflector for use in the apparatus of the present invention.

The deposition process may be arranged so that multiple and different feedstock materials can be dispensed. In creating three-dimensional objects by depositing layers of solidifiable material, supporting layers or structures are generally needed underneath any overhanging portions of an object, or in cavities of an object under construction, which are not directly supported by the modeling material itself. It is well-known in the art that a support material may be deposited in coordination with deposition of the modeling material to form these supporting structures or layers. In the practice of the present invention, a support structure may be built utilizing the same deposition techniques and apparatus by which the modeling material is deposited. Support material can be deposited either from a separate extrusion head within the modeling apparatus, or by the same extrusion head that deposits modeling material. More specifically, the apparatus 10 may accommodate the dispensing of the two materials by: (1) providing two dispensing heads each held by a carriage, one supplied with modeling material and one supplied with support material; (2) providing a single dispensing head supplied with both the modeling material and support material, with a single nozzle for dispensing both materials (such as shown in FIG. 6 of the '329 patent); or (3) providing a single dispensing head supplied with both materials, with each material dispensed through a separate nozzle (such as shown in FIG. 6 of the '785 patent). Similarly, the apparatus may be designed to dispense two different modeling materials to form a multi-phase article or multi-colored article as well.

When modeling with a material that absorbs moisture at a fast rate (as many high temperature thermoplastics do), the material supply 146 should be protected from moisture. If moisture is absorbed by the modeling material, model quality can be impaired. For example, in modeling with Ultem™, a moisture content of greater than 0.05 percent has been found to impair model quality. A suitable dry environment can be achieved by active drying of the material supply 146. Or, the build environment could be depleted of oxygen and filled instead with another gas or gas mixture, eliminating the need for active drying.

In the embodiment shown, an air deflection duct 150 is mounted on the extrusion head 14, as shown in FIG. 2, to prevent a hot spot from developing in the area of the nozzle 66. When forming a part that calls for only small movements of the extrusion head 14, heat radiated from the extrusion head 14 will tend to stagnate and create a hot spot at the nozzle 66. If a hot spot develops, the temperature of the extruded material surrounding the hot spot will increase. If the extruded material approaches its glass transition temperature, the material will deform and poor part quality will result. In prior art systems, which have a build chamber heated to between 70° C. and 90° C., ambient air has been blown into the chamber to avoid development of a hot spot in the area of the nozzle. In a high temperature build environment, ambient temperature air would cool the extruded material too abruptly, causing curl stresses and resulting in geometric distortion of the object being built.

Figure 7:
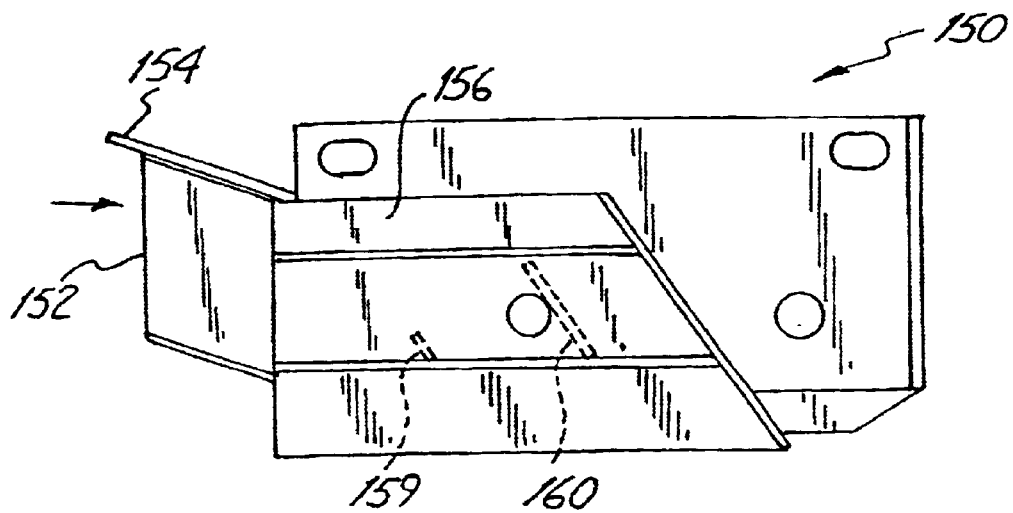
FIG. 7 is a side elevation of the air deflector shown in FIG. 6.
Figure 8:
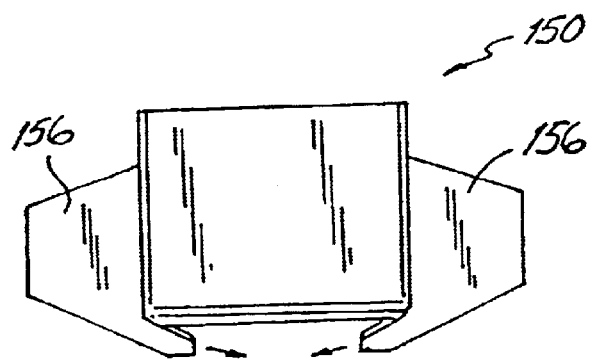
FIG. 8 is a rear elevation of the air deflector shown in FIG. 6.

The air deflector 150, which is shown in FIGS. 6–8, uses air flow within the build chamber 24 to cool the nozzle area. As shown, the air deflector 150 has a nose 152 facing the air exhaust vent 32. Above the nose 152 is a pair of vanes 154, that split air flowing from the exhaust vent 32 into two streams. The air streams flow into two ducts 156, located on either side of the nose 152. The air ducts 156 angle downward and then inward towards one another, so that the airflow from both ducts is directed towards the nozzle 66. Air ducts 156 each have a forward vane 159 and a rearward vane 160 which further divide the airflow into three channels within each duct 156. The channels assure fairly even distribution of air flow to the nozzle area. It is not necessary, however, that the air ducts 156 be subdivided into multiple channels. Rather, any means of deflecting air flow to the nozzle area can be used with advantage in the present invention.

Figure 9:
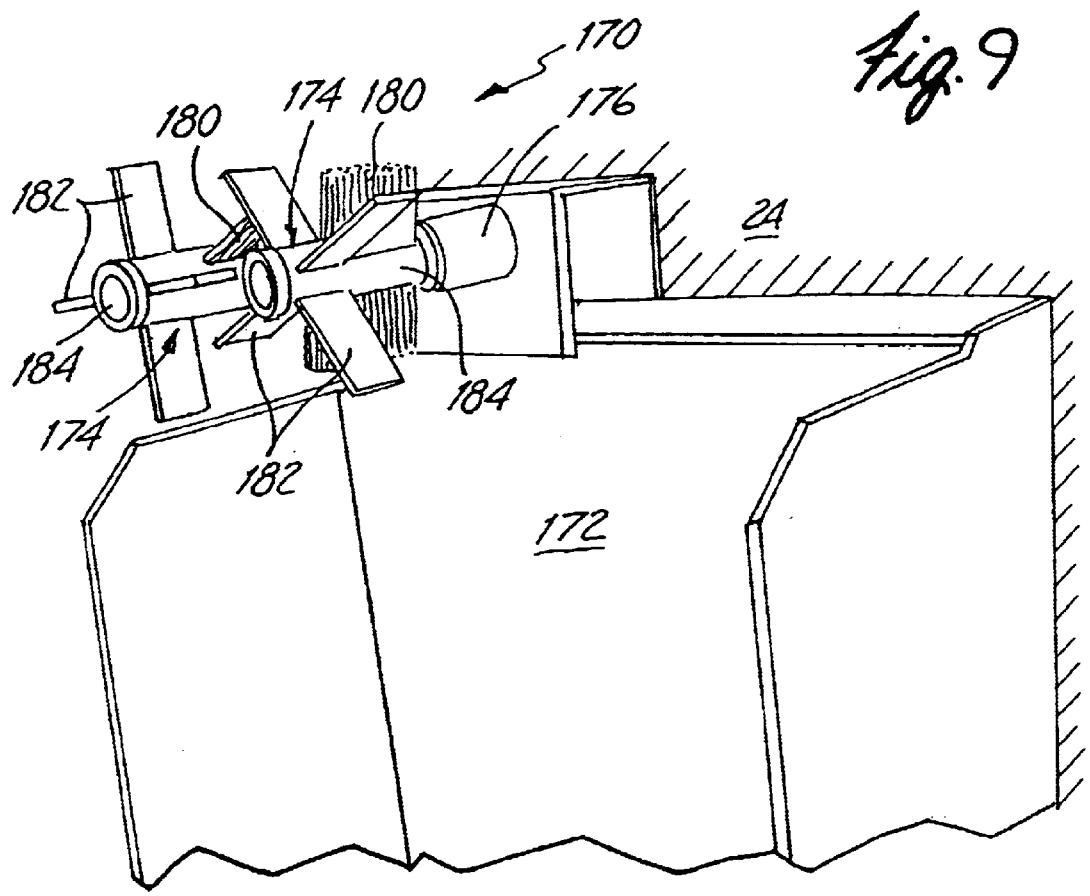
FIG. 9 is a perspective view of a nozzle cleaning assembly for use in the apparatus of the present invention.

In building a model by deposition from an extruder, modeling material can accumulate on the nozzle and can eventually clog the nozzle. High temperature thermoplastics are particularly prone to build up, as they tend to be sticky. Accordingly, the preferred embodiment of the present invention includes a nozzle cleaning assembly 170 for removing modeling material built upon the nozzle 66. The nozzle cleaning assembly 170, shown in FIG. 9, is mounted near the top of the build chamber 24 on the right hand side thereof. Beneath the nozzle cleaning assembly is a waste chute 172 for catching loose modeling material. The waste chute 172 narrows and travels between the heating duct 26 and the vertical slits 46, to exit through the bottom of the oven 12. The assembly 170 includes two cleaners 174 mounted side-by-side in counter-rotating shafts 176 driven by a motor 178 (shown in FIG. 1) in response to control signals from the controller 140. The motor 178 is mounted external to the oven 12.

As shown, each cleaner 174 is formed of a brush 180 and two cris-crossed flexible paddles 182, spaced apart and centered on a shaft 184. Steel is a preferred material for the brushes 180 and silicone is a preferred material for the paddles 182. In use, the extrusion head nozzle 66 is cleaned by the nozzle cleaning assembly 170 by driving the nozzle 66 back and forth between the cleaners 174, while the cleaners 174 are driven so as to impart a downward force against the nozzles. A rotational speed of 550 rpm is effective. The paddles 182 dislodge material from the nozzle 66, and the brushes 180 brush the material off of the nozzle 66. The loose material then drops into the waste chute 172. Preferably, a waste receptacle is placed under the exit of the waste chute 172. The cleaners 174 are removable from shafts 176, for cleaning or replacement. Those skilled in the art will recognize that many varieties of the nozzle cleaners 174 are possible, so long as the cleaners will remove material from the nozzle 66 when rotated against it.

Although the present invention has been described with reference to preferred embodiments, workers skilled in the art will recognize that changes may be made in form and detail without departing from the spirit and scope of the invention. For example, the present invention is not limited to use in extrusion-based deposition modeling systems of the preferred embodiment described herein. Other additive process manufacturing techniques which form three-dimensional objects in a heated chamber can benefit from the present invention, such as systems that build three-dimensional objects by jetting droplets of solidifiable material, by consumable rod arc welding or by plasma spraying.

What is claimed is:

1. A three-dimensional modeling apparatus comprising a heated build chamber in which three-dimensional objects are built, a base located in the build chamber, a dispensing head for dispensing modeling material onto the base, the dispensing head having a modeling material dispensing outlet inside of the build chamber, and an x-y-z gantry coupled to the dispensing head and to the base for generating relative movement in three-dimensions between the dispensing head and the base, characterized in that:

the x-y-z gantry is located external to the build chamber and is separated from the chamber by a deformable thermal insulator.

2. The apparatus of claim 1, wherein the deformable thermal insulator forms a portion of the build chamber through which the x-y-z gantry moves the dispensing head.

3. The apparatus of claim 2, wherein the x-y-z gantry comprises:

an x-y gantry coupled to the dispensing head to effect movement of the dispensing head in an x, y plane; and a z-lift coupled to the base to effect movement of the base along a z-axis.

4. The apparatus of claim 3, wherein the z-lift is coupled to the base through sealed slits in walls of the build chamber.

5. The apparatus of claim 1, wherein the deformable thermal insulator forms a portion of the build chamber through which the x-y-z gantry is coupled to the base.

6. The apparatus of claim 1, wherein the dispensing head has a modeling material receiving inlet external to the build chamber.

7. The apparatus of claim 1, and further comprising:

a frame on which the x-y-z gantry and the build chamber are mounted.

8. The apparatus of claim 1, wherein the build chamber is heated to a temperature greater than 150° C.

9. The apparatus of claim 1, wherein the x-y-z gantry effects movement of the dispensing head and the base in three non-orthogonal degrees of freedom.

10. A three-dimensional modeling apparatus comprising:

a heated build chamber;

a movable base located in the build chamber;

a movable dispensing head having an outlet for controllably dispensing modeling material, the outlet being located in the build chamber; and an x-y-z gantry coupled to the dispensing head and to the base for moving the dispensing head and the base in three-dimensions with respect to one another in synchrony with the dispensing of modeling material so as to build up a three-dimensional object of predetermined shape, the x-y-z gantry being located external to and in thermal isolation from the build chamber.

11. The modeling apparatus of claim 10, wherein the build chamber has a ceiling formed of a deformable thermal insulator through which the x-y-z gantry moves the dispensing head.

12. The modeling apparatus of claim 11, wherein the x-y-z gantry comprises:

an x-y gantry coupled to the dispensing head to effect movement of the dispensing head in an x, y plane; and a z-lift coupled to the base to effect a movement of the base along a z-axis.

13. The modeling apparatus of claim 12, wherein the dispensing head has a modeling material receiving inlet located outside of the build chamber.

14. The modeling apparatus of claim 10, and further comprising:

a frame external to the build chamber on which the x-y-z gantry and the build chamber are mounted.

15. The modeling apparatus of claim 10, wherein the build chamber is heated by convection such that an air flow pattern is created in the build chamber, and further comprising:

a means mounted to the dispensing head for deflecting air in the flow pattern towards the dispensing head outlet.

16. The modeling apparatus of claim 10, and further comprising:

a means for removing a buildup of modeling material from the dispensing head outlet.

17. The modeling apparatus of claim 10, wherein the build chamber is heated to a temperature greater than 150° C.

18. A three-dimensional modeling apparatus comprising a heated build chamber in which three-dimensional objects are built, a base located in the build chamber, an dispensing head for dispensing modeling material onto the base, the dispensing head having a material dispensing outlet in the build chamber, and an x-y gantry coupled to the dispensing head for translating the dispensing head in an x, y plane, characterized in that:

the x-y gantry is located external to and in thermal isolation from the build chamber; and a deformable thermal insulator forms a portion of the build chamber through which the x-y gantry moves the dispensing head.

19. The apparatus of claim 18, wherein the dispensing head has a material receiving inlet outside of the build chamber.

20. The modeling apparatus of claim 18, wherein the build chamber is heated by convection such that an air flow pattern is created in the build chamber, and further comprising:

a means mounted to the dispensing head for deflecting air in the flow pattern towards the dispensing head outlet.

21. The modeling apparatus of claim 18, and further comprising:

a means for removing a buildup of modeling material from the dispensing head outlet.

22. The apparatus of claim 18, and further comprising:

a z-lift located external to and in thermal isolation from the build chamber, the z-lift being coupled to the base through sealed slits in walls of the build chamber.

\* \* \* \* \*

UNITED STATES PATENT AND TRADEMARK OFFICE
CERTIFICATE OF CORRECTION

PATENT NO. : 6,722,872 B1 Page 1 of 1
APPLICATION NO. : 10/018673
DATED : April 20, 2004
INVENTOR(S) : William J. Swanson et al.

It is certified that error appears in the above-identified patent and that said Letters Patent is hereby corrected as shown below:

Column 1,
Line 40, delete "base", insert -- base. --.

Column 6,
Line 41, delete "96.", insert -- 96, --.

Column 8,
Line 15, delete "pace", insert -- place --.
Line 19, delete "alterative,", insert -- alternative, --.

Signed and Sealed this

Twenty-seventh Day of June, 2006

JON W. DUDAS
*Director of the United States Patent and Trademark Office*